United States Patent [19]

Ooi et al.

[11] Patent Number: 5,020,117
[45] Date of Patent: May 28, 1991

[54] HANDWRITTEN CHARACTER STRING RECOGNITION SYSTEM

[75] Inventors: Katsunori Ooi, Yokohama; Hiroshi Sasaki, Tokyo; Shunji Ariyoshi, Yokohama, all of Japan

[73] Assignee: Kabushiki Kaisha Toshiba, Kawasaki, Japan

[21] Appl. No.: 298,041

[22] Filed: Jan. 18, 1989

[30] Foreign Application Priority Data

Jan. 18, 1988 [JP] Japan ................................ 63-7926
Jan. 18, 1988 [JP] Japan ................................ 63-7927

[51] Int. Cl.$^5$ ............................................. G06K 9/32
[52] U.S. Cl. ................................. 382/46; 382/13; 382/24; 382/33; 382/34
[58] Field of Search ................. 382/34, 13, 24, 33, 382/59, 56, 46; 178/18, 20

[56] References Cited

U.S. PATENT DOCUMENTS 4,685,142  8/1987  Ooi et al. ............................. 382/13

Primary Examiner—Michael Razavi
Attorney, Agent, or Firm—Oblon, Spivak, McClelland, Maier & Neustadt

[57] ABSTRACT

Recognition character candidates and their similarities for each character obtained by a character recognition section from an input character string are stored in a first recognition result memory, and recognition character candidates obtained by rotating the corresponding characters through 180 degrees and their similarities are stored in a second recognition result memory. Address pointers for accessing the first and second recognition result memories are stored in an address pointer memory. The first recognition result memory is accessed in accordance with the address pointers read out from the address pointer memory in an ascending order, and the second recognition result memory is accessed in accordance with the address pointers read out from the address pointer memory in a descending order. Coincidences between recognition candidates read out from the first and second recognition result memories and character strings of dictionary words read out from a dictionary memory are computed by a coincidence computing section. A recognition result of the input character string is obtained based on the coincidences.

11 Claims, 8 Drawing Sheets

| I | 0→1→2 |
| II | 0→3→4 |
| III | 0→3→6 |
| IV | 1→2→4 |
| V | 1→2→6 |
| VI | 2→4→5 |

| ADDRESS | | | |
|---|---|---|---|
| 0 | 0 | 10 | 20 |
| 3 | 0 | 30 | 40 |
| 6 | 0 | 30 | 60 |
| 9 | 10 | 20 | 40 |
| 12 | 10 | 20 | 60 |
| 15 | 20 | 40 | 50 |
F I G. 7
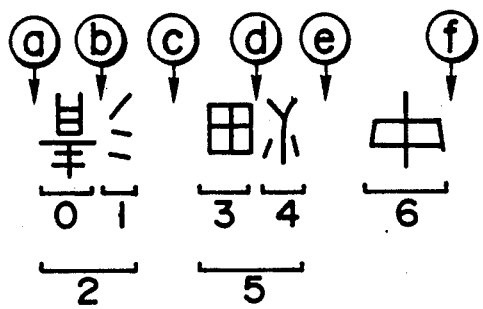
F I G. 10A
| 青 | シ | 畑 | | 中 |
|---|---|---|---|---|
| 青 | シ | 田 | 火 | |
| 清 | | 田 | 火 | |
| 清 | | 畑 | | |
F I G. 10B

FIG. 9A

| P | ADR | CANDIDATE ORDER 0 | 1 | 2 | 3 | 4 | | 9 |
|---|---|---|---|---|---|---|---|---|
| 0 | 0 | 中 | 川 | 一 | 十 | 大 | | |
| 1 | 10 | 小 | 火 | 一 | 水 | 天 | | |
| 2 | 20 | 田 | 囚 | 匹 | 固 | 匡 | | |
| 3 | 30 | 畑 | 軸 | 伸 | 俸 | 江 | | |
| 4 | 40 | 三 | ミ | ・ | ユ | 三 | | |
| 5 | 50 | 圭 | 青 | 百 | 童 | 冒 | | |
| 6 | 60 | 清 | 律 | 湧 | 蒲 | 鯖 | | |

FIG. 9B

| P | ADR | CANDIDATE ORDER 0 | 1 | 2 | 3 | 4 | | 9 |
|---|---|---|---|---|---|---|---|---|
| 0 | 0 | 中 | 川 | 一 | 山 | Y | | |
| 1 | 10 | 小 | 火 | 中 | 水 | 大 | | |
| 2 | 20 | 田 | 回 | 囚 | 匹 | 可 | | |
| 3 | 30 | 畔 | 鴨 | 町 | 軒 | 札 | | |
| 4 | 40 | 三 | た | ・ | 七 | 日 | | |
| 5 | 50 | 圭 | 皇 | 目 | 春 | 昌 | | |
| 6 | 60 | 郡 | 形 | 彩 | 影 | 朝 | | |

FIG. 11A

| P | ADR | CANDIDATE ORDER 0 | 1 | 2 | 3 | 4 | | 9 |
|---|---|---|---|---|---|---|---|---|
| 0 | 0 | 圭 | 皇 | 日 | 書 | 昌 | | |
| 1 | 10 | 三 | た | 十 | 七 | 日 | | |
| 2 | 20 | 彫 | 形 | 彩 | 影 | 朝 | | |
| 3 | 30 | 田 | 回 | 田 | 囲 | 可 | | |
| 4 | 40 | 畔 | 火 | 中 | 水 | 米 | | |
| 5 | 50 | 畔 | 鴨 | 町 | 軒 | 礼 | | |
| 6 | 60 | 中 | 川 | 丨 | 山 | Y | | |

FIG. 11B

| P | ADR | CANDIDATE ORDER 0 | 1 | 2 | 3 | 4 | | 9 |
|---|---|---|---|---|---|---|---|---|
| 0 | 0 | 圭 | 青 | 百 | 童 | 冒 | | |
| 1 | 10 | 三 | シ | 亠 | ユ | 三 | | |
| 2 | 20 | 清 | 律 | 湧 | 満 | 鯖 | | |
| 3 | 30 | 田 | 囲 | 匹 | 囲 | 匡 | | |
| 4 | 40 | 小 | 火 | 中 | 水 | 天 | | |
| 5 | 50 | 畑 | 軸 | 伸 | 神 | 沈 | | |
| 6 | 60 | 中 | 小 | 丨 | 巾 | 大 | | |

# HANDWRITTEN CHARACTER STRING RECOGNITION SYSTEM

BACKGROUND OF THE INVENTION

1. Field of the Invention

The present invention relates to a character recognition system for recognizing a character string read through, e.g., an optical character reading apparatus.

2. Description of the Related Art

Normally, a character string printed on a slip is read by an optical character reader (OCR), and the read character string is recognized in units of characters to be input to a computer. In this case, various character recognition techniques have been proposed, as described in U.S. Pat. No. 3,541,511, for example.

In such a character recognition system, when a handwritten character string is to be recognized, various problems are posed. For example, since handwritten characters have a variety of sizes, individual characters must be extracted from an input character string. In this case, when a handwritten character is a Chinese character, its left- and right-hand radicals may be extracted as separate character strings. For example, as shown in FIG. 1, if a character string " 中地清 " is input, characters may be extracted like " 中七日有", " 中地清 ", " 中地 有 ", " 中地;有 ", and so on, as shown in FIG. 2. As a result, a recognition result may become different from the input character string.

In a conventional system, recognition character candidates corresponding to characters are stored in a recognition result memory. A character candidate string of a character string to be recognized is generated using the character candidates stored in the recognition result memory, and is stored in a character candidate memory. The character candidate string is read out from the character candidate memory, and is collated with a character string of a dictionary word registered in a dictionary memory, thereby obtaining a recognition result.

A conventional character recognition system disclosed in Unscreened Japanese Patent Disclosure (Kokai) No. 61-160182; Y. KUROSAWA, Unscreened Date: Jul. 19, 1986, is known. In this character recognition system, since the recognition direction of characters is limited to one direction, if characters rotated through 180 degrees are input, they cannot be recognized.

SUMMARY OF THE INVENTION

It is an object of the present invention to provide a character recognition system which can reduce a memory capacity and can improve processing efficiency.

In order to achieve the above object of the present invention, a character recognition system of the present invention for recognizing an input character pattern by comparing the input character pattern with a basic character pattern in a dictionary memory which stores characters to be recognized, said system comprises: means for extracting, in units of a character, a pattern of each of a pattern of an input character string, and a pattern obtained by rotating the input character string pattern by a predetermined angle, and for obtaining recognition character candidates for the extracted character patterns in units of a character; and means for obtaining a coincidence between the recognition character candidates obtained by said means for obtaining recognition character candidates, and the character patterns stored in said dictionary memory.

BRIEF DESCRIPTION OF THE DRAWINGS

Other objects and features of the present invention will be apparent from the following description taken in connection with the following figures in which:

FIG. 4 is a view for explaining a transition network for controlling character extraction of the input character string;

FIG. 5 is a view for explaining character candidate groups stored in a recognition result memory;

FIG. 6 is a view for explaining management data indicating a combination of character candidates constituting a character string candidate;

FIG. 7 is a view for explaining addresses of a recognition result memory stored in an address pointer memory;

FIGS. 9A and 9B are views showing character candidate groups stored in first and second recognition result memories when the character string shown in FIG. 1 is input in the embodiment shown in FIG. 3;

10A is a view showing a character string which is input upside down, and FIG. 10B is a view for explaining character extraction of the input character string shown in FIG. 10A;

FIGS. 11A and 11B are views showing character candidate groups stored in first and second recognition result memories when the character string shown in FIG. 10A is input in the embodiment shown in FIG. 8;

DETAILED DESCRIPTION OF THE PREFERRED EMBODIMENTS

Figure 3:
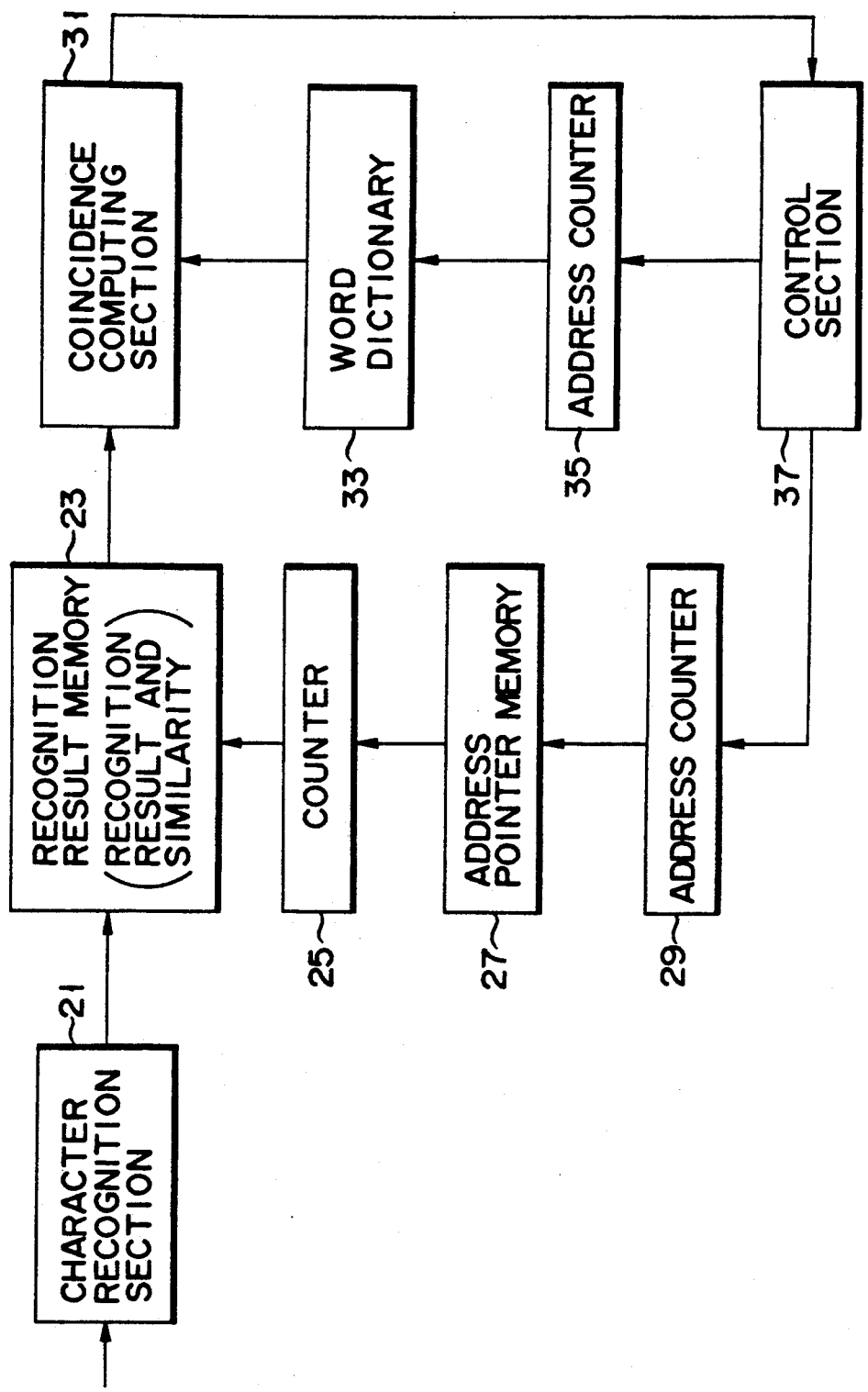
FIG. 3 is a block diagram showing an embodiment of a character recognition system according to the present invention.

FIG. 3 is a block diagram showing an embodiment of a character recognition system according to the present invention. Character recognition section 21 extracts individual characters from a character string input from, e.g., an OCR and computes a plurality of character recognition candidates of each extracted character and their similarities in the same manner as in character recognition section 1 in a conventional system. Character recognition section 21 is described in detail in U.S. Pat. No. 3,541,511. A detailed technique of the similarity computation is described in U.S. Pat. No. 3,688,267.

Recognition result memory 23 stores a plurality of character candidates and their similarities output from section 21. In this embodiment, memory 23 stores first through tenth character candidates for each extracted character. Address pointer memory 27 stores addresses for accessing memory 23. More specifically, memory 27 stores addresses of the recognition result memory locations at which character candidate groups necessary for generating character string candidates corresponding to an input character string are stored, in units of character candidates and in correspondence with first through tenth character candidate groups. Note that counter 25 supplies addresses for sequentially reading out the first through tenth character candidate groups stored in the recognition result memory. Addresses are supplied from memory 27 through counter 25 to read out character string candidates from recognition result memory 23. The readout candidate is supplied to coincidence computing section 31.

Word dictionary 33 as a dictionary memory stores a plurality of character strings of words to be recognized. Corresponding character strings are supplied from word dictionary 33 to coincidence computing section 31 in accordance with addresses supplied from address counter 35 under the control of control section 37. Section 31 computes coincidences between the character string candidates supplied from recognition result memory 23 and character strings of dictionary words supplied from dictionary memory 33. Control section 37 comprises, e.g., a microcomputer, and outputs a character string candidate having a highest one of coincidences supplied from the coincidence computing section as a recognition result of the input character string.

Figures 1, 2:
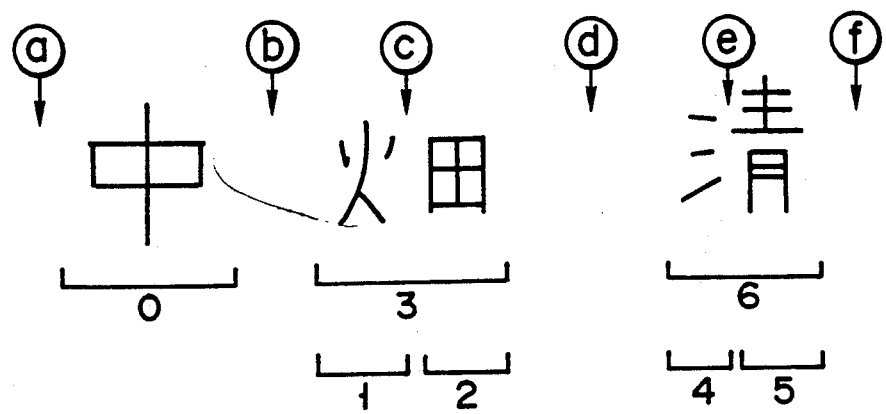
FIG. 1 is a view for explaining a character string input to a conventional character recognition system and a character recognition system according to the present invention.
FIG. 2 is a view for explaining character extraction from the input character string shown in FIG. 1.
Figures 4, 5, 6:
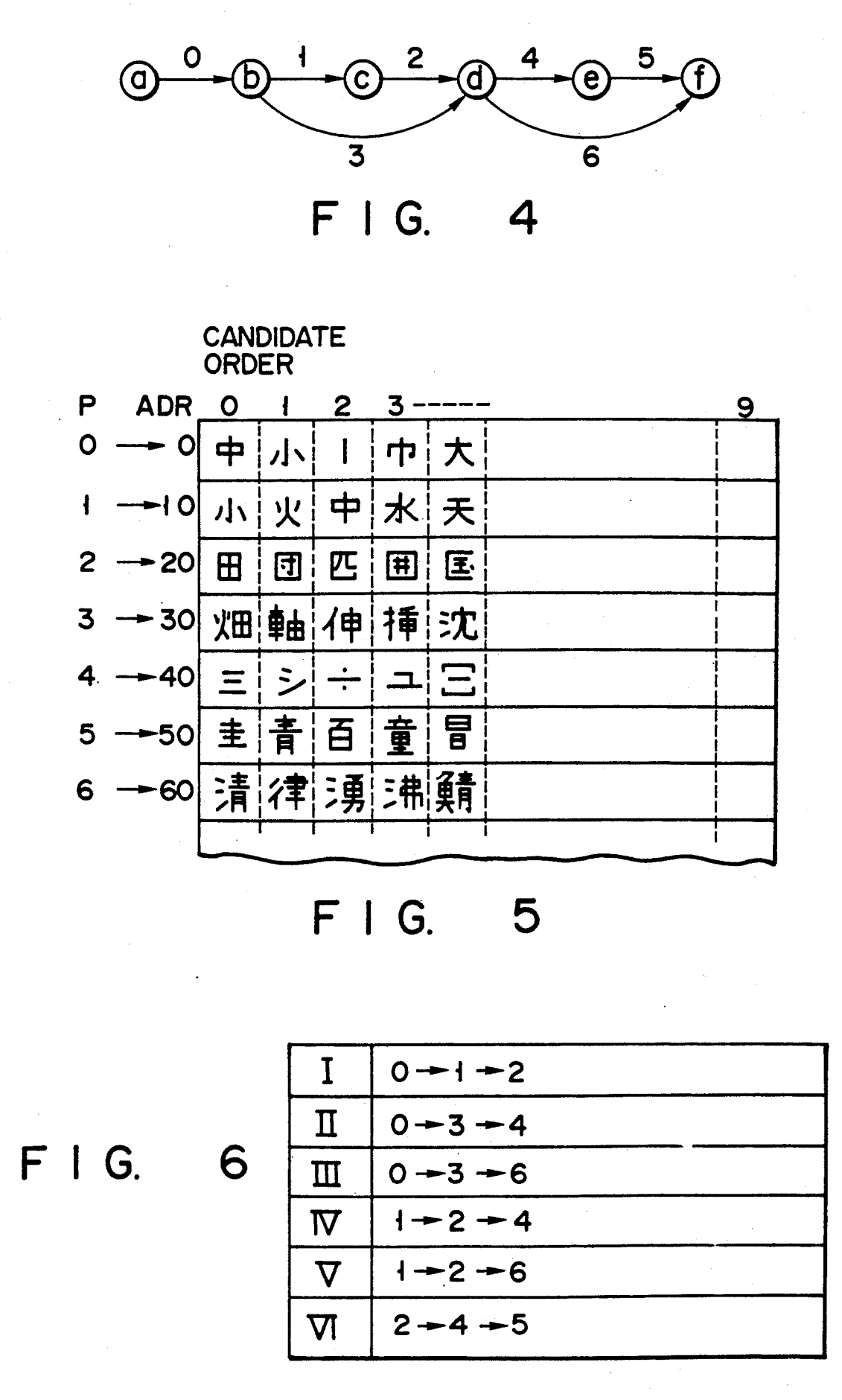

Assume that a character string " 中৩ই " is input, as shown in FIG. 1. Character recognition section 21 obtains separation data of characters like a, b, c, d, e, and f, and forms a transition network, as shown in FIG. 4. The arcs of the transition network are sequentially labeled, and are used as management data of character candidates. More specifically, the input character string " 中৩ই " is extracted as a character portion " 中 " (label 0), a character portion " ৬ " (label 1), a character portion " ৩ " (label 2), a character portion " ৬৩ " (label 3), a character portion " ই " (label 4), a character portion " 千 " (label 5), and a character portion " ই " (label 6). For each extracted character, first through tenth character candidates are obtained. As a result, first through tenth recognition character candidates are stored in the recognition result memory, as shown in FIG. 5.

When a character string to be recognized consists of, e.g., three characters, address pointer memory 27 reads out three continuous recognition character candidates from recognition result memory 23, and forms management data of a combination of character candidates from which a character candidate string is to be generated, as shown in FIG. 6. In this embodiment, management data 0→1→2, 0→3→4, 0→3→6, 1→2→4, 1→2→6, and 2→4→5 are formed. Address pointer memory 27 stores addresses of the recognition result memory at which character candidates are actually stored based on the management data. For example, if the character string is constituted by three characters like " 中৩ই ", as shown in FIG. 1, addresses "0", "10", and "20" at which first character candidates are stored in recognition result memory 23 are stored in memory 27 in correspondence with label data 0→1→2 as shown in FIG. 7. Similarly, addresses "0", "30", and "40" are stored in correspondence with label data 0→3→4; addresses "0", "30", and "60" are stored in correspondence with label data 0→3→6; addresses "10", "20", and "40" are stored in correspondence with label data 1→2→4; addresses "10", "20", and "60" are stored in correspondence with label data 1→2→6; and addresses "20", "40", and "50" are stored in correspondence with label data 2→4→5. Therefore, control section 37 increments address counter 29 by one, thus obtaining a read address for accessing recognition result memory 23 from the address pointer memory. The readout address, e.g., "0" is supplied to counter 25. Counter 25 counts ten times from an initial value supplied from memory 27, and supplies counts to recognition result memory 23 as addresses. As a result, first through tenth character candidates are read out from the recognition result memory, and are supplied to coincidence computing section 31. Similarly, address pointer "10" stored at address "1" of address pointer memory 27 is read out, and is supplied to counter 25. Thus, the counter supplies addresses "10" through "19" to recognition result memory 23. As a result, a character candidate group consisting of " ৬ ", " ৬ ", " 中 ", " ৬ ", " ই ", . . . , and a character candidate group consisting of " 中 ", " ৬ ", " ই ", " 中 ", " ই ", . . . , are supplied to coincidence computing section 31. Furthermore, address pointer "20" is read out from address pointer memory 27, and the counter supplies addresses "20" to "29" to memory 23 based on the address pointer. As a result, a character candidate group consisting of " 日 ", " 日 ", " 回 ", " 日 ", " 目 ", . . . are supplied to coincidence computing section 31. Similarly, a character string candidate corresponding to addresses "0", "30", "40", a character string candidate corresponding to addresses "0", "30", "60", a character string candidate corresponding to addresses "10", "20", "40", a character string candidate corresponding to addresses "10", "20", "60", and a character string candidate corresponding to addresses "20", "40", "50" are read out from recognition result memory 23, and are sent to coincidence computing section 31.

Coincidence computing section 31 performs coincidence computation between the supplied character string candidates and character strings of dictionary words stored in word dictionary 33. As a result, control section 37 outputs a character string having a highest coincidence as a recognition result of the input character string.

Figure 8:
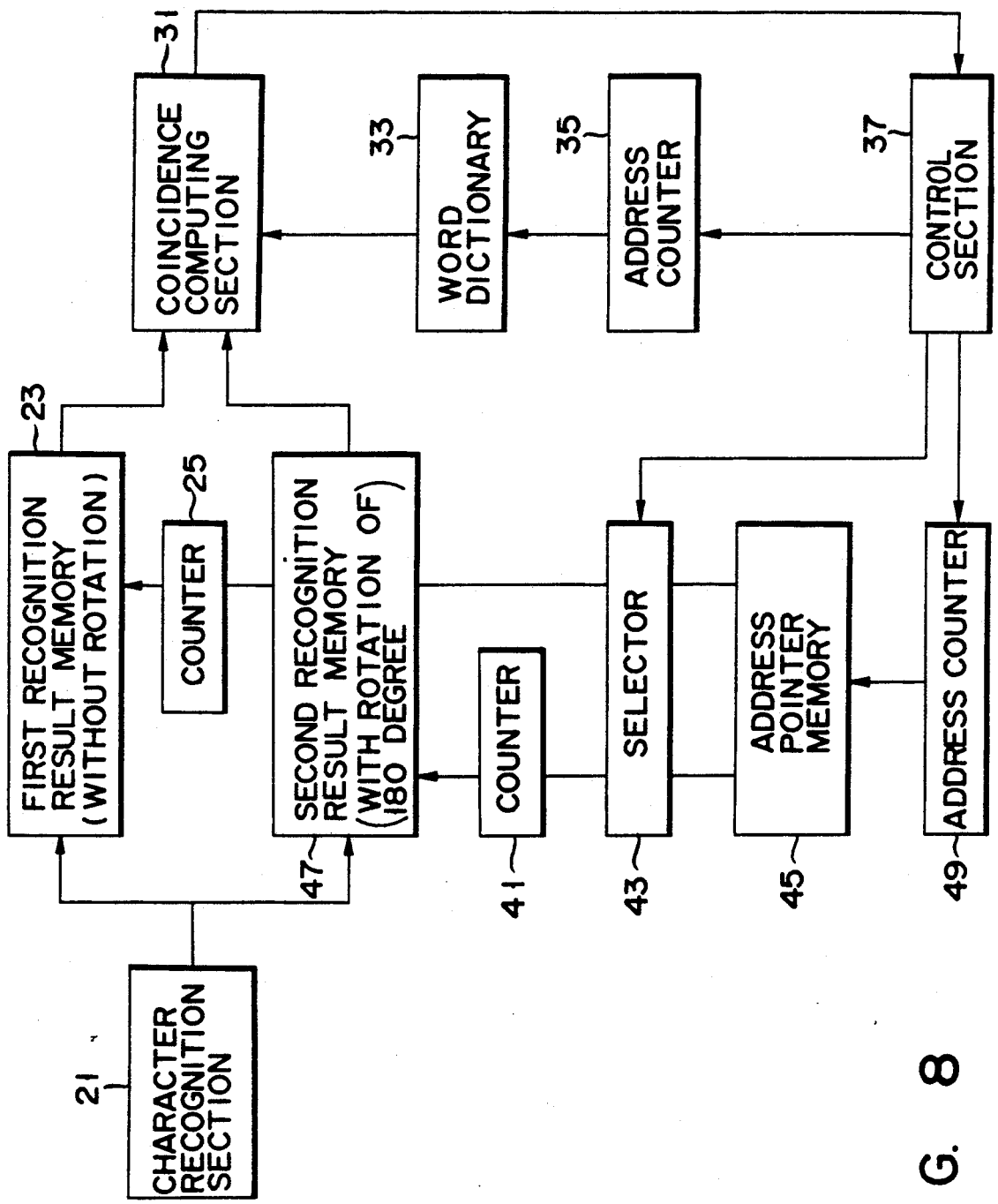
FIG. 8 is a block diagram showing another embodiment of a character recognition system according to the present invention.

FIG. 8 is a block diagram showing another embodiment of the present invention. Note that the same reference numerals in FIG. 8 denote the same parts as in FIG. 3, and a detailed description thereof will be omitted. In the embodiment shown in FIG. 3, a character string supplied from the OCR is recognized in a forward direction without being rotated. In contrast to this, in the embodiment shown in FIG. 8, a character string supplied from the OCR is recognized in a forward direction without being rotated, and at the same time, the input character string is rotated through 180 degrees and the rotated character string is recognized in the opposite direction. As a result, even if an original to be read by the OCR is set upside down, correct recognition can be achieved. This embodiment will be described below in detail. First recognition result memory 23 has the same arrangement as that of recognition result memory 23 shown in FIG. 3, and stores first through tenth character candidate groups and their similarities in correspondence with characters extracted in the forward direction by character recognition section 21 from a character string input from the OCR.

In contrast to this, second recognition result memory 47 stores first through tenth character candidate groups of characters obtained by rotating characters of the input character string through 180 degrees, and their similarities. Counters 25 and 41 output addresses for reading out first through tenth character candidate groups from first and second recognition result memories 23 and 47, respectively. Address counter 41 is an up-down counter, and outputs addresses to address pointer memory 45 in an ascending or descending order. Selector 43 supplies addresses in the ascending order output from address pointer memory 45 to first recognition result memory 23, and supplies addresses in the descending order to second recognition result memory 47 based on a selection signal output from control section 37.

The operation of the embodiment shown in FIG. 8 will be described below with reference to FIGS. 9A through 14. Assume that a character string input from the OCR is " ", as shown in FIG. 1. In this case, character recognition section 21 forms a transition network shown in FIG. 4, and generates management data shown in FIG. 6, in the same manner as described with reference to FIG. 3. Therefore, a group of first through tenth character candidates are stored in first recognition result memory 23 in an order of " 中 ", " 火 ", " 日 ", " 甲 ", " き ", " 丰 ", and " 淸 " like the content of memory 23 shown in FIG. 5. On the other hand, section 21 obtains a group of first through tenth character candidates for characters " 中 ", " 禾 ", " 冊 ", " 甲 ", " き ", " 丰 ", and " 봒 " obtained by rotating the characters " 中 ", " 火 ", " 日 ", " 甲 ", " き ", " 丰 ", and " 淸 " through 180 degrees, and stores them in second recognition result memory 47. Thus, character candidate groups are stored in second recognition result memory 47, as shown in FIG. 9B. The same management data as in FIG. 6 indicating combinations of character candidates are then formed. As a result, addresses for accessing first and second recognition result memories 23 and 47 are stored in address pointer memory 45, as shown in FIG. 7. Control section 37 controls address counter 49 to perform a count-up operation, and controls selector 43 to select the first recognition result memory. Address "0" is then read out from address pointer memory 45, and is supplied to counter 25. Counter 25 supplies addresses "0" through "9" to memory 23 from address "0" as an initial value. The characters " 中 ", " 小 ", " 1 ", " 巾 ", " 木 ", . . . are read out from memory 23, and are supplied to coincidence computing section 31. Address "10" is then read out from memory 45, and is supplied to counter 25. As a result, counter 25 counts addresses "10" to "19" from address "10" as an initial value, and supplies them to memory 23. Thus, memory 23 outputs characters " 小 ", " 火 ", " 中 ", " 木 ", " 木 ", . . . to coincidence computing section 31. Similarly, control section 37 fetches address "20" from memory 45, and supplies it to counter 25 through selector 43. Thus, characters " 日 ", " 日 ", " 口 ", " 団 ", " 宦 ", . . . are read out from memory 23, and are supplied to coincidence computing section 31. Similarly, a character string candidate corresponding to addresses "0", "30", "40", a character string candidate corresponding to addresses "10", "20", "40", a character string candidate corresponding to addresses "10", "20", "60", and a character string candidate corresponding to addresses "20", "40", "50" are output from memory 23 to section 31. Section 31 performs coincidence computation between supplied character string candidates and character strings of dictionary words in word dictionary 33. As a result, control section 37 outputs a character string having a highest coincidence as a recognition result of the input character string.

On the other hand, control section 37 controls address counter 49 to perform a count-down operation, and controls selector 43 so that addresses are supplied from address pointer memory 45 to second recognition result memory 47. As a result, control section 37 sets "17" in address counter 48 as an initial value, and sends a down-count control signal to address counter 49. Address "50" is read out from address "17" of memory 45, and is supplied to counter 41 through selector 43. Counter 41 supplies addresses "50" through "59" to memory 47, so that memory 47 sends characters " 主 ", " 皇 ", " 日 ", " 丰 ", " 書 ", . . . to coincidence computing section 31. Similarly, memory 47 supplies characters " 三 ", " 上 ", " 亠 ", " 七 ", " 日 ", . . . , stored at addresses "40" through "49" to coincidence computing section 31. Furthermore, memory 47 outputs characters " 回 ", " 回 ", " 匹 ", " 圆 ", " 可 ", . . . , corresponding to addresses "20" through "29" to section 31. Similarly, addresses "60", "20", and "10" are read out from address pointer memory 45, and a corresponding character string candidate is supplied to section 31 under the control of counter 41. This operation is repeated until addresses "20", "10", and finally "0" are read out from memory 45. In this case, section 31 determines that no character string coinciding with the input character string is present.

Figures 12, 13, 14:
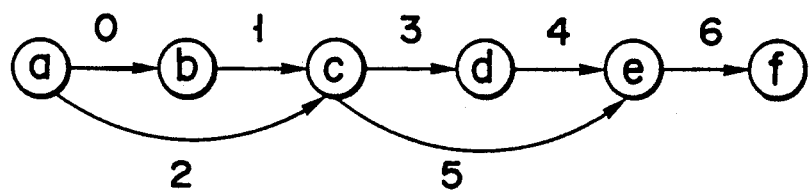
FIG. 12 is a transition network for controlling character extraction when the character string shown in FIG. 10A is input.
FIG. 13 is a management data table showing combinations of character candidates generated from the transition network shown in FIG. 12.
FIG. 14 is a view showing a content of an address pointer memory shown in FIG. 8.

Recognition when a character string is input in the form of " 붎ㅁ中 " as shown in FIG. 10A will be described below. In this case, character recognition section 21 obtains first through tenth character candidates corresponding to " 中 ", " 禾 ", " 日 ", " 甲 ", " き ", " 丰 ", and " 봒 ", and stores them in first recognition result memory 23. Furthermore, section 21 obtains first through tenth character candidates corresponding to characters " 丰 ", " 三 ", " 淸 ", " 日 ", " 火 ", " 甲 ", and " 中 " obtained by rotating the above characters through 180 degrees, and stores them in second recognition result memory 47. A transition network shown in FIG. 12 is formed based on separation data a, b, c, d, e, and f and label data shown in FIG. 10A. Section 21 forms management data indicating combinations of character candidates constituting a character string candidate based on the transition network, as shown in FIG. 13. As a result, addresses for accessing first and second memories 23 and 47 are stored in memory 45, as shown in FIG. 14.

Control section 37 controls address counter 49 to perform a count-up operation. As a result, address counter 49 supplies address "0" to address pointer memory 45. Memory 45 outputs address "0". Address "0" is supplied to counter 25 through selector 43. Counter 25 counts addresses "0" through "9" and supplies them to memory 23. Memory 23 outputs contents at addresses "0" through "9", i.e., " 主 ", " 皇 ", " 日 ", " 丰 ", " 書 ", . . . to the coincidence computing section. Counter 49 then increments an address by one and supplies address "10" to memory 45. Thus, memory 45, supplies address "10" to memory 23. As a result, memory 23 outputs contents at addresses "1038 through "19", i.e., " 三 ", " 上 ", " 亠 ", " 七 ", " 日 ", . . . to coincidence computing section 31. Similarly, since counter 49 supplies address "30" to memory 45, memory 45 supplies address "30" to counter 25 through the selector. Thus, counter 25 supplies addresses "30" through "39" to memory 23. Therefore, memory 23 outputs characters " 回 ", " 回 ", " 匹 ", " 圆 ", " 可 ", . . . to coincidence computing section 31. Similarly, a character string candidate corresponding to addresses "10", "30", and "40", a character string candidate corresponding to addresses "10", "50", and "60", a character string candidate corresponding to addresses "20", "30", and "40", a character string candidate corresponding to addresses "20", "50", and "60", and a character string candidate corresponding to addresses "30", "40", and "60" are read out from memory 23 and are supplied to section 31. Section 31 performs coincidence computation between supplied character strings and character strings of dictionary words in word dictionary 33. As a result, control section 37 outputs a character string having a highest coincidence as a recognition result of the input character string. However, in this case, there is no result corresponding to the input character string.

Control section 37 controls address counter 49 to perform a count-down operation, and controls selector 43 so that addresses are supplied from memory 45 to memory 47. As a result, control section 37 sets "17" in address counter 49 as an initial value, and sends a down-count control signal to address counter 49. As a result, address "60" is read out from address "17" of memory 45, and is supplied to counter 41 through selector 43. Counter 41 then supplies addresses "60" through "69" to second recognition result memory 47. Memory 47 outputs "中", "小", "1", "中", "大", ... to coincidence computing section 31. Similarly, memory 47 outputs "小", "化", "中", "水", "天", ... stored at addresses "40" through "49" to section 31. Furthermore, memory 47 supplies "日", "日", "旧", "日", "旦", ... stored at addresses 30 through 39 to section 31. In this manner, a character string corresponding to addresses "60", "50", and "40", a character string corresponding to addresses "40", "30", and "20", a character string corresponding to addresses "60", "50", and "10", a character string corresponding to addresses "40", "30", and "10", and a character string corresponding to addresses "30", "10", and "0" are read out from memory 47, and are supplied to section 31. The coincidence computing section computes coincidences of the input character strings, and supplies them to control section 37. As a result, control section 37 outputs a character string having a highest coincidence as a recognition result of the input character string. In this case, when addresses "60", "50", and "20" are supplied to second recognition result memory 47, a character string "中烟禾" is recognized.

The present invention is not limited to the above embodiment. For example, various techniques of extracting characters from an input character string, and character recognition techniques of extracted characters may be appropriately selected, and the generation order of character candidate strings may be determined depending upon applications. Dictionary words to be recognized and their numbers of characters are not particularly limited. A rotational angle of an input character pattern is not limited to the value described in the above embodiment, and recognition processing may be performed after characters are rotated through 90 degrees or 270 degrees. Thus, vertically or horizontally written characters or inclined characters can be coped with.

Recognition processing of handwritten characters has been described. However, the present invention can be applied to a case wherein a speech input is extracted in units of syllables, and recognition processing is performed.

What is claimed is:

1. A character string recognition system for recognizing an input character by comparing the input character with a basic character in a dictionary memory which stores characters to be recognized, said system comprising:
    means for extracting, in units of a character, characters from an input character string;
    means for rotating the input character string by a predetermined angle;
    means for obtaining, in units of a character, recognition character candidates for each character extracted by said extracting means and each character rotated by said rotating means; and
    means for obtaining a coincidence between the recognition character candidates obtained by said means for obtaining recognition character candidates, and the characters stored in said dictionary memory.

2. A character string recognition system according to claim 1, further comprising means for obtaining an order for computing the coincidence by said coincidence obtaining means based on the recognition character candidate obtained by said means for obtaining the recognition character candidate.

3. A character string recognition system according to claim 1, further comprising:
    first storage means for storing the recognition character candidates directly obtained from input characters among the recognition character candidates obtained by said means for obtaining the recognition character candidates; and
    second storage means for storing the recognition character candidates obtained by rotating the input character string by 180 degrees.

4. A character string recognition system comprising:
    character recognition means for extracting characters from an input character string and outputting a recognition character candidate and similarity data for each extracted character;
    recognition result memory means for storing each recognition character candidate and similarity data from said character recognition means;
    address pointer memory means for sequentially storing address pointers for accessing said recognition result memory means based on extraction results of the characters obtained by said character recognition means;
    dictionary memory means for storing character strings of words to be recognized;
    memory access means for accessing said recognition result memory means in accordance with the address pointers read out from said address pointer memory means;
    coincidence computing means for computing coincidences between each recognition character candidate read out from said recognition result memory means and character strings of dictionary words stored in said dictionary memory based on the similarity data; and
    means for comparing the coincidences computed for the character strings of the dictionary words by said coincidence computing means and obtaining a recognition result of the input character string.

5. A system according to claim 1, wherein the recognition character candidate comprises a plurality of character candidate groups, and said address pointer memory means stores a location address representing a location of said recognition result memory means storing each character candidate group, and stores the location addresses in an order of character candidates constituting. Each character candidate groups of the recognition character candidate.

6. A system according to claim 5, further comprising address counter means for accessing character candidates constituting each character candidate group stored in said recognition result memory means, said address counter means supplying addresses for accessing the character candidates to said recognition result memory means starting from an address supplied from said address pointer memory means.

7. A character string recognition system comprising:
character recognition means for extracting characters from an input character string and outputting a recognition character candidate and similarity data of each extracted character;
first recognition result memory means for storing a recognition character candidate and similarity data for each character obtained by said character recognition means;
character rotation means for rotating each character extracted from the input character string by a predetermined angle;
second recognition result memory means for storing a recognition character candidate and similarity data for each rotated character;
address pointer memory means for sequentially storing address pointers for accessing said first and second recognition result memory means based on each recognition character candidates of each character obtained by said character recognition means;
dictionary memory means for storing character strings of words to be recognized;
memory access means for accessing said first recognition result memory means in accordance with the address pointers read out from said address pointer memory means in an ascending order and accessing said second recognition result memory means in accordance with the address pointers read out from said address pointer memory means in a descending order;
coincidence computing means for computing coincidences between recognition candidates sequentially read out from said first and second recognition result memory means and character strings of dictionary words stored in said dictionary memory means based on the similarity data; and
means for comparing the coincidences computed for the character strings of the dictionary words by said coincidence computing means and obtaining a recognition result of the input character string.

8. A system according to claim 7, wherein common addresses are assigned to said first and second recognition result memory means, and the recognition character candidate consists of a plurality of character candidate groups, and said address pointer memory means stores a location address representing a location of said recognition result memory means storing each character candidate group, and stores the location addresses in an order of character candidates constituting each character candidate groups of the recognition character candidate.

9. A system according to claim 8, further comprising first and second address counter means for accessing character candidates constituting each character candidate group stored in said first and second recognition result memory means, said first and second address counter means supplying addresses for accessing the character candidates to said first and second recognition result memory means starting from an address supplied from said address pointer memory means.

10. A system according to claim 7, wherein said character rotation means rotates each character by 180 degrees.

11. A system according to claim 7, wherein said character rotation means rotates each character by 270 degrees.

* * * * *